K. E. EDGEWORTH.
TREATMENT OF PEAT FOR FUEL AND APPARATUS THEREFOR.
APPLICATION FILED SEPT. 12, 1918.

1,347,940. Patented July 27, 1920.

Witnesses
J. K. Moore
R. E. Barry

Inventor
Kenneth E. Edgeworth
By Whitaker & Prevost
attys.

UNITED STATES PATENT OFFICE.

KENNETH ESSEX EDGEWORTH, OF DUBLIN, IRELAND.

TREATMENT OF PEAT FOR FUEL AND APPARATUS THEREFOR.

1,347,940. Specification of Letters Patent. Patented July 27, 1920.

Application filed September 12, 1918. Serial No. 253,847.

*To all whom it may concern:*

Be it known that I, KENNETH ESSEX EDGEWORTH, a subject of the King of Great Britain, residing at Cherbury, Booterstown, Co. Dublin, Ireland, have invented new and useful Improvements Relating to the Treatment of Peat for Fuel and Apparatus Therefor, of which the following is a specification.

My invention relates to the manufacture of peat for fuel, and to that method wherein the peat is first heated to a temperature of 150° C. or over in a closed vessel, thereby reducing it to such a condition that the greater part of the water can be eliminated in a filter press. Peat which has been subjected to such treatment will be referred to as "carbonized peat."

My invention consists in an improved form of filtering apparatus wherein a higher percentage of water can be abstracted from carbonized peat than is possible with the forms of apparatus now in use.

According to my invention the filtering elements, which are made of unglazed porcelain or earthenware, are so arranged in the filter vessel that they are wholly surrounded by the substance to be filtered whereby they are enabled to withstand the high pressures to which they are subjected, which is not the case when the pressure is applied from one side or from within.

The filtering elements themselves may be in the form of plates, disks, cones or tubes.

The filtration is carried out under considerable heat and pressure and it is convenient to pump the peat directly into the filter from the vessel in which it is carbonized, thus saving both heat and power.

When filtration is complete and while the material still retains a portion of its heat and pressure, I provide for suddenly releasing the pressure within the filtering vessel, whereby a sudden generation of steam takes place which disintegrates the mass and detaches it from the filtering material.

My invention will be readily understood by reference to the accompanying drawings, in which:—

Figure 1:
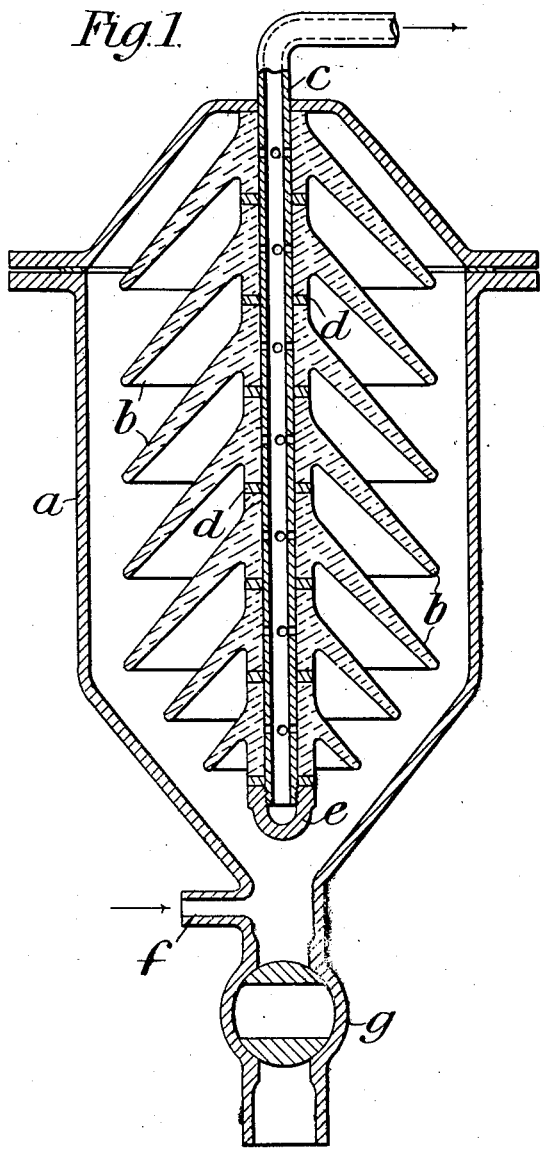
Figure 2:
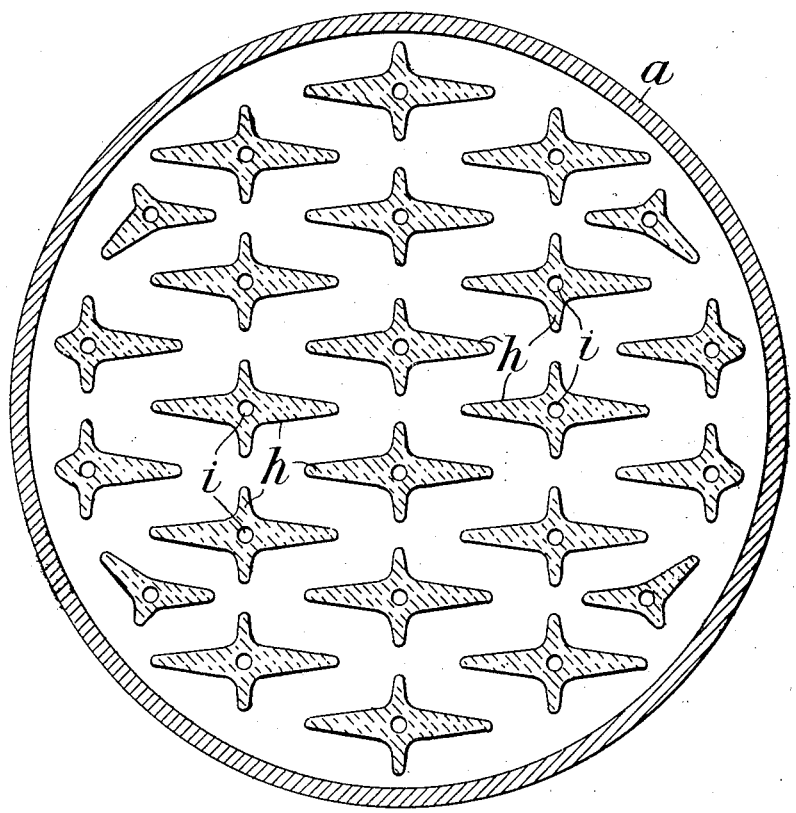

Figure 1 is a sectional view of a filtering vessel wherein the filtering surfaces are in the form of cones; and Fig. 2 is a horizontal section illustrating an arrangement wherein the filtering surfaces are more or less of plate form.

In the arrangement of my invention shown in Fig. 1 $a$ indicates the filtering vessel and $b$, $b$ the cones of unglazed porcelain, earthenware, or the like, which constitutes the filtering material. These cones are slipped over a perforated tube $c$, which serves for the escape of water, and are separated by washers $d$, $d$ which prevent the escape of the peat between the cones, and are held in position by a cap $e$.

$f$ indicates the pipe or nozzle through which the unfiltered peat enters the filtering vessel, and $g$ a cock or tap through which the filtered peat is discharged.

The action of the apparatus is as follows:—The tap $g$ being closed, the unfiltered peat, at the determined temperature of, say 200° C. and pressure of, say, 600 lbs. per square inch, is admitted into the vessel $a$ through the pipe $f$, the water percolating through the filtering material, of which the cones $b$, $b$ are composed, and escaping through the perforations of the pipe $c$. When filtration has continued for a sufficient time a tap (not shown) in the pipe $f$ is closed to shut off further supplies of raw peat, while the steam and water, under the internal pressure, continue to escape through the filtering material, whereby a fall of temperature and pressure occurs in the filtering vessel. When a temperature is reached, convenient for the discharge, say for example 130° C., but which temperature may be varied according to the nature of the peat under treatment and in practice should not fall below 105° C., the tap $g$ is opened to the atmosphere, whereupon, a sudden generation of steam will take place, whereby the whole mass will be disintegrated and detached from the filtering material, and fall by gravity to the bottom of the vessel and be discharged through the tap $g$. The action may be assisted by closing a tap (not shown) in the pipe $c$ at the same time that the tap $g$ is opened, thereby causing the return of a small quantity of the water which has already passed through the filtering material.

Instead of employing cones as shown the filtering elements may be in the form of plain plates or disks applied upon the tube $c$.

In the arrangement of my invention shown in Fig. 2 the filtering elements are in the form of star-shaped plates $h$, $h$ formed with tubular passages $i$ through which the water will escape, the said plates being preferably supported from the upper ends in such a manner that the water can be discharged. This construction leaves the bottoms of the plates free and allows an uninterrupted passage for the peat when the vessel is discharged. The action of the apparatus is similar to that of the apparatus already described.

Instead of plates, tubular filtering devices of any other convenient form can be adopted.

The water escaping from the filter may be used for heating the raw peat thereby economizing fuel.

I am aware that the use of porous filter plates or blocks arranged in a filter vessel so as to be wholly surrounded by a liquid is not new *per se*, and I do not broadly claim such an arrangement.

Claim.

A method of extracting moisture from wet carbonized peat consisting in introducing the wet carbonized peat at a temperature above 100° C. under pressure sufficient to prevent the formation of steam therein into a container having a moisture outlet, exerting pressure on the peat to force moisture through said outlet, and suddenly releasing the pressure in the container, whereby steam is generated in the mass of filtered peat to cause disintegration of the same.

KENNETH ESSEX EDGEWORTH.